(12) United States Patent
Liu et al.

(10) Patent No.: US 11,093,946 B2
(45) Date of Patent: Aug. 17, 2021

(54) SYSTEM AND METHOD FOR EVALUATING RISK

(71) Applicant: ALIPAY (HANGZHOU) INFORMATION TECHNOLOGY CO., LTD., Zhejiang (CN)

(72) Inventors: Gan Liu, Hangzhou (CN); Feng Qi, Hangzhou (CN); Dapeng Fu, Hangzhou (CN); Zhigang Hua, Hangzhou (CN); Shuang Yang, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/086,355

(22) Filed: Oct. 31, 2020

(65) Prior Publication Data

US 2021/0049610 A1    Feb. 18, 2021

Related U.S. Application Data

(63) Continuation of application No. PCT/CN2019/127096, filed on Dec. 20, 2019.

(51) Int. Cl.
*G06Q 20/40* (2012.01)
*G06F 16/22* (2019.01)
*G06N 20/00* (2019.01)
*G06Q 30/00* (2012.01)
*G06Q 20/42* (2012.01)
*G06Q 30/02* (2012.01)
*G06Q 40/02* (2012.01)

(52) U.S. Cl.
CPC ..... *G06Q 20/4016* (2013.01); *G06F 16/2264* (2019.01); *G06N 20/00* (2019.01);
(Continued)

(58) Field of Classification Search
CPC . G06Q 20/4016; G06F 16/2264; G06N 20/00
(Continued)

(56) References Cited

U.S. PATENT DOCUMENTS

| 7,228,227 B2 | 6/2007 | Speer |
| 8,019,678 B2 | 9/2011 | Wright et al. |

(Continued)

FOREIGN PATENT DOCUMENTS

| CN | 110020775 A | 7/2019 |
| CN | 110147940 A | 8/2019 |

OTHER PUBLICATIONS

Written Opinion of the International Searching Authority and International Search Report for PCT Application No. PCT/CN2019/127096 dated Sep. 24, 2020.

*Primary Examiner* — Lindsay M Maguire

(57) ABSTRACT

Methods, systems, and apparatus, including computer programs encoded on computer storage media, for evaluating risk are provided. One of the methods includes: obtaining a plurality of transactions each comprising a plurality of data dimensions, wherein some of the plurality of transactions are labeled as risky transactions and some of the plurality of transactions are labeled as safe transactions; obtaining at least one of the plurality of data dimensions as an output space and the plurality of data dimensions other than the at least one data dimension as an input space; initializing a first mapping from the input space to a latent space and a second mapping from the latent space to the output space, wherein the first mapping comprises mapping the input space to the latent space according to an inverse of a generalized linear model; and optimizing the first mapping and the second mapping to generate a Bezier surface.

17 Claims, 5 Drawing Sheets

(52) U.S. Cl.
CPC ..... *G06Q 30/0185* (2013.01); *G06Q 20/4014* (2013.01); *G06Q 20/42* (2013.01); *G06Q 30/0201* (2013.01); *G06Q 30/0205* (2013.01); *G06Q 40/02* (2013.01)

(58) Field of Classification Search
USPC .......................................................... 705/35
See application file for complete search history.

(56) References Cited

U.S. PATENT DOCUMENTS

| | | | |
|---|---|---|---|
| 8,032,448 B2 | 10/2011 | Anderson et al. | |
| 8,471,852 B1 * | 6/2013 | Bunnell | G06T 17/30 |
| | | | 345/423 |
| 8,639,618 B2 | 1/2014 | Yan et al. | |
| 8,850,517 B2 | 9/2014 | Kumar | |
| 9,383,212 B2 | 7/2016 | Dorum et al. | |
| 9,741,133 B2 | 8/2017 | Yu et al. | |
| 9,754,256 B2 | 9/2017 | Britton et al. | |
| 9,785,146 B2 | 10/2017 | Azar | |
| 9,901,290 B2 | 2/2018 | Najafi et al. | |
| 10,068,193 B2 | 9/2018 | Miller et al. | |
| 10,275,772 B2 | 4/2019 | Ronca et al. | |
| 2005/0089237 A1 | 4/2005 | Park et al. | |
| 2010/0318655 A1 * | 12/2010 | Kajiya | G06F 8/34 |
| | | | 709/225 |
| 2014/0122343 A1 | 5/2014 | Einav et al. | |
| 2016/0078531 A1 | 3/2016 | Bartlett et al. | |
| 2019/0378209 A1 | 12/2019 | Saste et al. | |

* cited by examiner

300

310: obtaining a plurality of transactions each comprising a plurality of data dimensions, wherein some of the plurality of transactions are labelled as risky transactions and some of the plurality of transactions are labelled as safe transactions

320: obtaining at least one of the plurality of data dimensions as an output space and the plurality of data dimensions other than the at least one data dimension as an input space

330: initializing a first mapping from the input space to a latent space and a second mapping from the latent space to the output space, wherein the first mapping comprises mapping the input space to the latent space according to an inverse of a generalized linear model

340: optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary

FIG. 3

SYSTEM AND METHOD FOR EVALUATING RISK

CROSS REFERENCE TO RELATED APPLICATION

The present application is a continuation application of International Patent Application No. PCT/CN2019/127096, filed on Dec. 20, 2019, and entitled "SYSTEM AND METHOD FOR EVALUATING RISK", the entire contents of which are incorporated herein by reference.

TECHNICAL FIELD

This application generally relates to systems and methods for evaluating risk.

BACKGROUND

Entities such as banks and ecommerce platforms often need to process a large volume of transactions every day. Some of the transactions may be fraudulent. To prevent economic losses to customers and deter frauds, it is desirable to provide systems and methods that can evaluate transaction risks and perform effective screening.

SUMMARY

Various embodiments of the specification include, but are not limited to, systems, methods, and non-transitory computer readable media for evaluating risk.

According to some embodiments, a computer-implemented method for evaluating risk comprises: obtaining a plurality of transactions each comprising a plurality of data dimensions, wherein some of the plurality of transactions are labeled as risky transactions and some of the plurality of transactions are labeled as safe transactions; obtaining at least one of the plurality of data dimensions as an output space and the plurality of data dimensions other than the at least one data dimension as an input space; initializing a first mapping from the input space to a latent space and a second mapping from the latent space to the output space, wherein the first mapping comprises mapping the input space to the latent space according to an inverse of a generalized linear model; and optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary.

In some embodiments, the method further comprises: obtaining a proposed transaction comprising the plurality of data dimensions; mapping the proposed transaction to a space of the plurality of data dimensions, wherein the Bezier surface is generated in the space of the plurality of data dimensions; in response to finding the proposed transaction falling on the one side of the Bezier surface, preventing or delaying execution of the proposed transaction; and in response to finding the proposed transaction falling on the another side of the Bezier surface, permitting execution of the proposed transaction.

In some embodiments, optimizing the first mapping and the second mapping to generate the Bezier surface comprises optimizing the first mapping and the second mapping to generate at least a first Bezier surface corresponding to a high risk level and a second Bezier surface corresponding to a low risk level. In response to finding the proposed transaction falling on the one side of the Bezier surface, preventing or delaying execution of the proposed transaction comprises: in response to finding the proposed transaction above the first Bezier surface and the second Bezier surface, preventing execution of the proposed transaction, and in response to finding the proposed transaction between the first Bezier surface and the second Bezier surface, performing a verification step as a condition for permitting execution of the proposed transaction. In response to finding the proposed transaction falling on the another side of the Bezier surface, permitting execution of the proposed transaction comprises: in response to finding the proposed transaction below the first Bezier surface and the second Bezier surface, permitting execution of the proposed transaction.

In some embodiments, the input space comprises a feature vector; the output space comprises an output vector; and the latent space comprises two or more parametric coordinates.

In some embodiments, the output vector of each of the plurality of transactions is differentiable.

In some embodiments, the plurality of data dimensions comprise one or more of the following: transaction time, transaction location, transaction frequency, user history, transaction amount, and risk level.

In some embodiments, the plurality of data dimensions comprise at least three data dimensions; and the at least three data dimensions comprise a risk level of a transaction sender, a risk level of a transaction recipient, and a transaction amount.

In some embodiments, optimizing the first mapping comprises solving a first order H-data dimensional equation; and the latent space comprises H data dimensions.

In some embodiments, optimizing the first mapping and the second mapping comprises optimizing the first mapping and the second mapping through reinforcement learning.

In some embodiments, the generalized linear model maps the latent space to the input space through a link function.

In some embodiments, the link function comprises an identity function, a log function, or a logit function.

In some embodiments, the second mapping comprises mapping the latent space to the output space through an H-data dimensional Bernstein polynomial.

According to other embodiments, a system for evaluating risk comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for evaluating risk comprises a plurality of modules for performing the method of any of the preceding embodiments.

According to some embodiments, a system for evaluating risk comprises one or more processors and one or more non-transitory computer readable storage media storing instructions executable by the one or more processors to cause the one or more processors to perform operations comprising: obtaining a plurality of transactions each comprising a plurality of data dimensions, wherein some of the plurality of transactions are labeled as risky transactions and some of the plurality of transactions are labeled as safe transactions; obtaining at least one of the plurality of data dimensions as an output space and the plurality of data dimensions other than the at least one data dimension as an input space; initializing a first mapping from the input space to a latent space and a second mapping from the latent space to the output space, wherein the first mapping comprises mapping the input space to the latent space according to an inverse of a generalized linear model; and optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary.

According to other embodiments, a non-transitory computer-readable storage medium is configured with instructions executable by one or more processors to cause the one or more processors to perform operations comprising: obtaining a plurality of transactions each comprising a plurality of data dimensions, wherein some of the plurality of transactions are labeled as risky transactions and some of the plurality of transactions are labeled as safe transactions; obtaining at least one of the plurality of data dimensions as an output space and the plurality of data dimensions other than the at least one data dimension as an input space; initializing a first mapping from the input space to a latent space and a second mapping from the latent space to the output space, wherein the first mapping comprises mapping the input space to the latent space according to an inverse of a generalized linear model; and optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary.

According to yet other embodiments, an apparatus for evaluating risk comprises: a first obtaining module for obtaining a plurality of transactions each comprising a plurality of data dimensions, wherein some of the plurality of transactions are labeled as risky transactions and some of the plurality of transactions are labeled as safe transactions; a second obtaining module for obtaining at least one of the plurality of data dimensions as an output space and the plurality of data dimensions other than the at least one data dimension as an input space; an initializing module for initializing a first mapping from the input space to a latent space and a second mapping from the latent space to the output space, wherein the first mapping comprises mapping the input space to the latent space according to an inverse of a generalized linear model; and an optimizing module for optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary.

Embodiments disclosed herein have one or more technical effects. In some embodiments, one or more Bezier surfaces are generated according to a Mixture Bezier Surface algorithm. In one embodiment, in a space representing various transaction features, the one or more Bezier surfaces are generated as one or more boundaries defining transactions of different risk levels. In one embodiment, by mapping unknown transactions to the space, the transactions can be efficiently screened in bulk. In one embodiment, by screening risky transactions, effective counter measures such as additional verification or transaction freeze can be automatically triggered to minimize the impact of fraudulent or malicious transactions. In some embodiments, the one or more Bezier surfaces are generated by using an inverse of a generalized linear model to map an input space to a latent space and then mapping the latent space to an output space. The generalized linear model enables the input space to accommodate a large number of dimensions corresponding to transaction features. In one embodiment, the large number of dimensions allow more transaction features to be accounted for in generating the Bezier surfaces, which may improve the accuracy of the boundaries and provide more control metrics for modeling.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 3 illustrates a method for evaluating risk in accordance with some embodiments.

DETAILED DESCRIPTION

Figure 1:
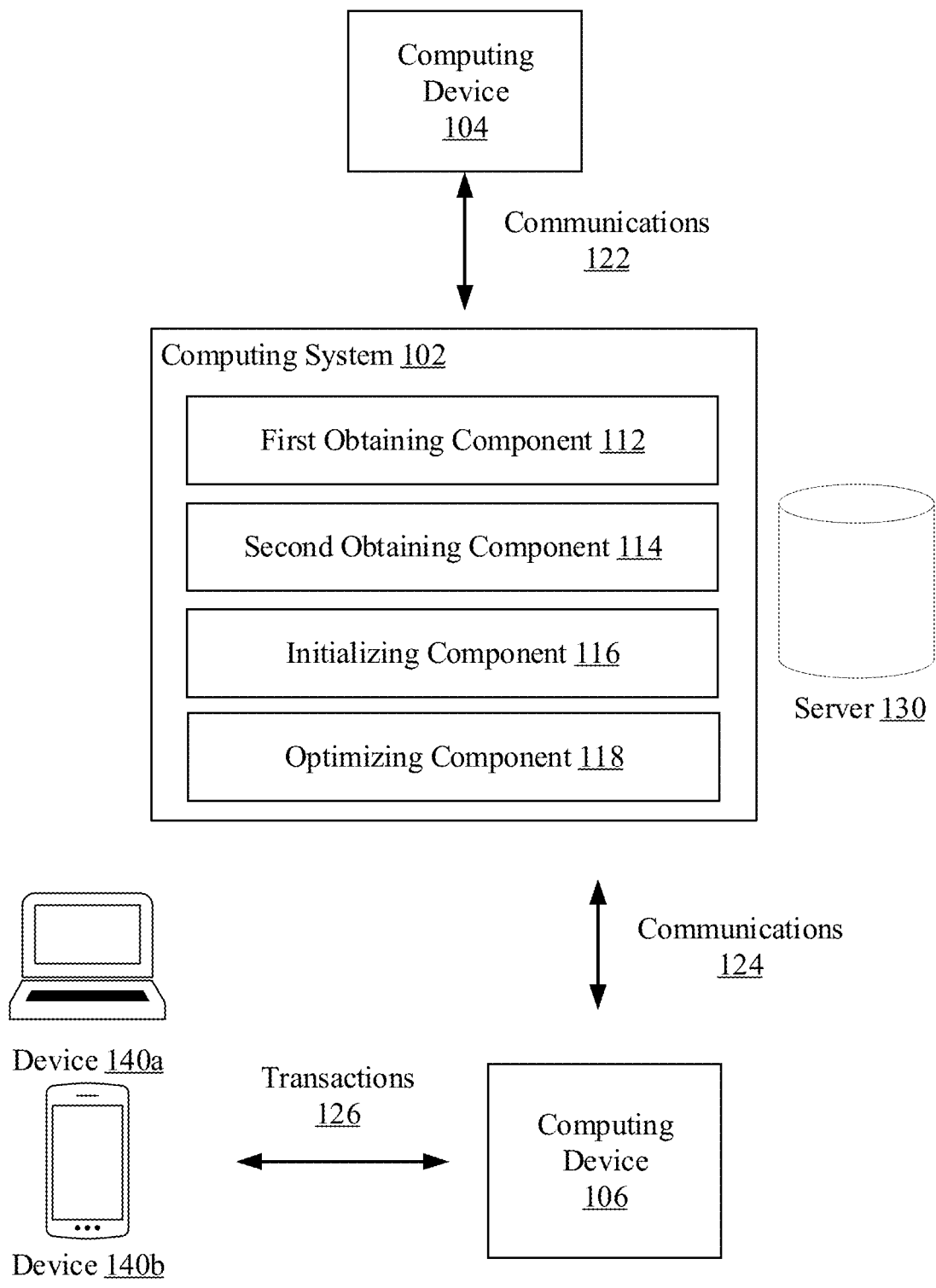
FIG. 1 illustrates a system for evaluating risk in accordance with some embodiments.

Effective screening methods are desirable for detecting malicious, fraudulent, or other risky transactions. To maintaining a high security standard, the screening methods need to be able to process large volumes of unidentified transactions based on available features. Some methods determine the risk levels of transactions (e.g., transactions to card, transactions to account) based on their various data features. For example, a Bezier surface may be generated for assigning the risk levels. Bezier surface is a species of mathematical spline. For example, a Bezier surface of degree (n, m) may be a set of $(n+1)(m+1)$ control points $k_{i,j}$. It maps the unit square into a smooth-continuous surface embedded within a space of the same dimensionality as $\{k_{i,j}\}$. For example, if k are all points in a four-dimensional space, the surface may be within a four-dimensional space.

In high-dimensional data modeling, for example, when the number of data features is large, the dimensions which correspond to the data features may be divided into inputs and outputs. In some embodiments, a D-dimensional Bezier surface may be used to model the relationship between I input dimensions and O output dimensions, where $I+O=D$. To determine the analytical form of the D-dimensional Bezier surface, a control space of H dimensions is needed, where $H<D$. Given a data point x in I, two steps are performed to compute the corresponding output y on a Bezier surface: (step 1) mapping x to h in H, and (step 2) mapping h to y.

For the traditional Bezier surface, mapping inputs to outputs is difficult or impossible. Here, a Bezier surface may specify a forward mapping from h to x by an order-of-P H-dimensional Bernstein polynomial, where P is an integer determined by the complexity of the surface. Thus, step 1 performs an inverse mapping of the forward mapping by solving an order-of-P H-dimensional equation system. However, because there is no analytical solution when P is large in the case of high-dimensional data modeling, this inverse mapping is extremely hard. That is, the traditional Bezier Surface is difficult to use when doing inference, namely checking whether a given point is on the surface or not, rendering the Bezier surface method ineffective for transaction screening when high dimensional data is involved.

Embodiments described herein provide methods, systems, and apparatus for evaluating risk. In some embodiments, a Mixture Bezier Surface algorithm is provided to generate one or more Bezier surfaces (or referred to as Mixture Bezier Surfaces) as boundaries for assigning risk levels for transactions. The Mixture Bezier Surface algorithm may map the inputs x to outputs y, even in high-dimensional data modeling. To ensure the inverse mapping in step 1, instead of the h-to-x Bernstein polynomial, a general linear model may be used to reduce the inverse computation to an $1^{st}$ order H-dimensional equation system. The y(x) mapping thus has an analytical solution and is differentiable. Accordingly, one or more Bezier surfaces may be generated based on a plurality of data features of labeled transactions for evaluating transaction risks.

FIG. 1 illustrates a system 100 for evaluating risk in accordance with some embodiments. The components of the system 100 presented below are intended to be illustrative. Depending on the implementation, the system 100 may include additional, fewer, or alternative components.

In some embodiments, the system 100 may include a computing system 102, a computing device 104, and a computing device 106. It is to be understood that although two computing devices are shown in FIG. 1, any number of computing devices may be included in the system 100. The computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

In some embodiments, the computing system 102 may include a first obtaining component 112, a second obtaining component 114, an initializing component 116, and an optimizing component 118. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the computing devices 104 and 106 may be implemented on or as various devices such as a mobile phone, tablet, server, desktop computer, laptop computer, etc. The computing system 102 may communicate with the computing devices 104 and 106, and other computing devices. Communication between devices may occur over the internet, through a local network (e.g., LAN), through direct communication (e.g., BLUETOOTH™, radio frequency, infrared), etc.

In some embodiments, the system 100 may include a risk evaluation platform. For example, the computing system 102 and/or other computing devices may implement the risk evaluation platform. The risk evaluation platform may build or train a model for evaluating risk and effectuate its applications. For example, the platform may obtain data (e.g., transactions associated with various data dimensions and labeled with different risk levels) from various sources, such as the computing device 104, through communications 122. The computing device 104 may have obtained or stored such data in advance or in real time. The platform may use the obtained data to build or train a risk evaluation model. The model may be deployed in a remote server, cloud, client-side device, etc. For example, the computing device 106 may be installed with a software application, a web application, an Application Program Interface (API), or another suitable interface for invoking the model.

In some embodiments, the model may be deployed in the computing device 106 or in the server 130. The computing device 106 may obtain one or more transactions 126 from one or more devices (e.g., 140a, 140b, etc.). The one or more devices may comprise mobile phone, tablet, server, desktop computer, laptop computer, etc. For example, device 140b may be a mobile phone used to conduct a transaction, which before being approved, is submitted to the computing device 106. The computing device 106 may apply the model deployed in the computing device 106 or invoke the model deployed in the server 130 through communications 124. The computing device 106 may apply the model to the one or more transactions 126 for determining their risk levels. Based on the determined risk levels, the computing device 106 may implement follow-up steps such as approving or rejecting the transaction (e.g., through sending an instruction to a device of a bank or a seller), requiring additional verifications (e.g., sending a verification code or task to the device 140b for verifying identity), etc.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. For example, the computing system 102 may incorporate the computing device 106, or vice versa. That is, each of the first obtaining component 112, the second obtaining component 114, the initializing component 116, and the optimizing component 118 may be implemented in the computing system 102 or the computing device 106. Similarly, the computing system 102 may couple to and associate with one or more other computing devices that effectuate a portion of the components or functions of the computing system 102. The computing device 106 may comprise one or more processors and one or more memories coupled to the processors configured with instructions executable by one or more processors to cause the one or more processors to perform various steps described herein.

The various components of the system 100 may be configured to perform steps for evaluating risk. In some embodiments, the first obtaining component 112 may be configured to obtain a plurality of transactions each comprising a plurality of data dimensions. A transaction may involve transacting a transaction amount of asset from one or more senders to one or more recipients. In one embodiment, the plurality of data dimensions comprise one or more of the following: transaction time (e.g., the date and/or time-of-the-day when the transaction is performed), transaction location (e.g., the geographical location where the transaction is performed), transaction frequency (e.g., the frequency of the same user conducting transaction, the frequency of the same type of transaction being performed), user history (e.g., how long the user has been registered with the transaction platform, user history of using services provided by the platform or other platforms), transaction amount, and risk level (e.g., risky, safe). In one embodiment, the plurality of data dimensions comprise at least three data dimensions, and the at least three data dimensions comprise a risk level of a transaction sender, a risk level of a transaction recipient, and a transaction amount. For example, a sender or recipient of a low credit score or an excessively large transaction amount may contribute to an elevated risk level.

In some embodiments, some of the plurality of transactions are labeled as risky transactions and some of the plurality of transactions are labeled as safe transactions. "Risky" and "safe" are relative terms indicating different risk level labels. There can be more than two labels for the transactions. For example, some transactions have risk levels 9-10 (labeled as risky), some transactions have risk levels 7-8 (labeled as probably risky), some transactions have risk levels 5-6 (labeled as risk-neutral), some transactions have risk levels 3-4 (labeled as probably safe), and some transactions have risk levels 1-2 (labeled as safe). In order to build or train an accurate mode, a portion of the labeled transactions may be borderline transactions. For example, most of the labeled transactions may fall closely to the generated Bezier surface.

In some embodiments, the second obtaining component 114 may be configured to obtain at least one of the plurality of data dimensions as an output space and the plurality of data dimensions other than the at least one data dimension as an input space. In some embodiments, the input space comprises a feature vector, the output space comprises an output vector, and the latent space comprises two or more parametric coordinates. For example, features such as the transaction time, transaction location, transaction frequency, user history, and transaction amount may form the input space comprising a feature vector of five dimensions, and the risk level may form the output space comprising an output vector of one dimension. In some embodiments, the output vector of each of the plurality of transactions is differentiable.

In some embodiments, the feature vector may comprise a numeric vector describing data in the input space. The feature vector may be mapped to a predetermined output space, the resulting vector of which may be the output vector. A D-dimensional Bezier surface may be defined as a parametric surface where the position of a point p is a function of the parametric coordinates (e.g., u and v in the 2-D parametric coordinates). The range for each parametric coordinate may be between 0 and 1. For any point obtained as a function of the parametric coordinates, a part of the point may be treated as the feature vector, and the rest may be treated as the output vector.

In some embodiments, the initializing component 116 may be configured to initialize a first mapping from the input space to a latent space and a second mapping from the latent space to the output space. The first mapping comprises mapping the input space to the latent space according to an inverse of a generalized linear model. The generalized linear model mapping may distort Bezier surface at the minimal cost, and its reverse may provide an easy way for inferring the latent space from the input space.

In some embodiments, the generalized linear model maps the latent space to the input space through a link function. In one embodiment, the link function comprises an identity function, a log function, or a logit function. The generalized linear model may be a flexible generalization of ordinary linear regression that allows for response variables that have error distribution models other than a normal distribution. The generalized linear model may generalize linear regression by allowing the linear model to be related to the response variable via a link function and by allowing the magnitude of the variance of each measurement to be a function of its predicted value. The link function provides the relationship between the linear predictor and the mean of the distribution function.

Figure 2A:
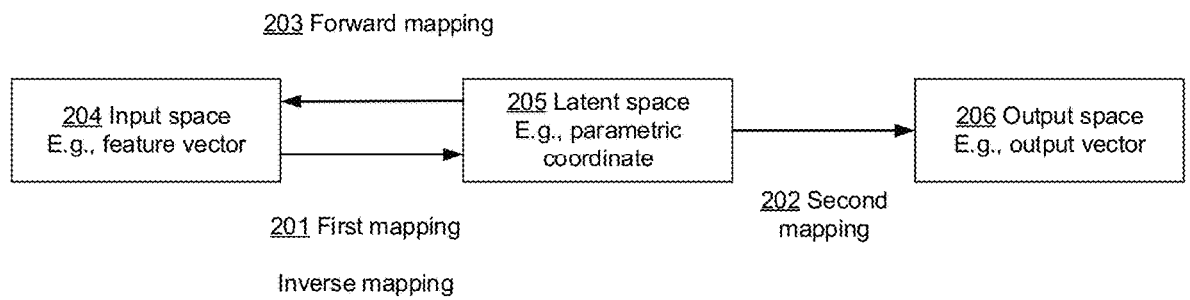
FIG. 2A illustrates a method for obtaining feature vectors in accordance with some embodiments.

Referring to FIG. 2A, FIG. 2A illustrates a method for obtaining feature vectors in accordance with some embodiments. The method may be performed by the computing device 106 and/or the computing system 102. In some embodiments, as shown in FIG. 2A, a first mapping 201 maps an input space 204 to a latent space 205, and a second mapping 202 maps the latent space 205 to an output space 206. In one embodiment, the second mapping 202 comprises mapping the latent space to the output space through an H-data dimensional Bernstein polynomial. The first mapping 201 is an inverse of the forward mapping 203. The forward mapping 203 may comprise a generalized linear model that maps the latent space 205 to the input space 204. The latent space may comprise two or more parametric coordinates. By having multiple dimensions for the input space and/or the latent space, more feature metrics can be used for determining risk levels. In addition, the accuracy for the Bezier surface is improved by the inclusion of more dimensions.

If the forward mapping 203 is an order-of-P H-dimensional Bernstein polynomial equation system, then the first mapping 201 needs to solve the inverse of the order-of-P H-dimensional Bernstein polynomial equation system, where P and H are integers determined by the complexity of the surface. There is no analytical solution when P is large.

If a Bezier surface specifies the forward mapping 203 from the latent space 205 to the input space 204 as an order-of-P H-dimensional Bernstein polynomial system. For example, in a 3-dimensional example, given u and v as the parametric coordinates and m×n control points ($K_{ij} \in R^3$), feature vector (x, y) may be obtained by the forward mapping 203, and output vector (z) may be obtained by the second mapping 202 as the following:

$$\begin{cases} x = \sum_{i=0}^{n} \sum_{j=0}^{m} B_i^n(u) B_j^m(v) K_{ij}^{(1)} \\ y = \sum_{i=0}^{n} \sum_{j=0}^{m} B_i^n(u) B_j^m(v) K_{ij}^{(2)} \\ z = \sum_{i=0}^{n} \sum_{j=0}^{m} B_i^n(u) B_j^m(v) K_{ij}^{(3)} \end{cases}$$

Thus, for the first mapping 201, an inverse mapping of the forward mapping 203 needs to solve an order-of-P H-dimensional equation system. Because there is no analytical solution when P is large in the case of high-dimensional data modeling, this inverse mapping is extremely hard, rendering the risk evaluation based on the Bezier surface impractical and implausible.

In some embodiments, for the forward mapping 203 from the latent space 205 to the input space 204, instead of the order-of-P H-dimensional Bernstein polynomial system, a generalized linear model mapping is used. The corresponding Bezier surface may be referred to as the Mixture Bezier Surface. For example, a generalized linear model mapping (u, v) to (x, y) is provided below, where g is a link function, and a and b are parameters. Thus, the first mapping 201 may be derived as an inverse of the generalized linear model without difficulty.

$$\begin{cases} x = g(a_x u + b_x) \\ y = g(a_y v + b_y) \end{cases}$$

The second mapping 202 from the latent space 205 to the output space 206 may use an order-of-P H-dimensional equation such as an H-data dimensional Bernstein polynomial. For example, the output space (z) may be mapped from (u, v) as the follows.

$$z = \sum_{i=0}^{n} \sum_{j=0}^{m} B_i^n(u) B_j^m(v) K_{ij}^{(3)}$$

Referring back to FIG. 1, the optimizing component 118 may be configured to optimize the first mapping and the second mapping to generate a Bezier surface as a boundary that divides the plurality of transactions with a threshold percentage (e.g., 99%) of the risky transactions falling on one side of the boundary and a threshold percentage (e.g., 95%) of the safe transactions falling on another side of the boundary.

In some embodiments, optimizing the first mapping comprises solving a first order H-data dimensional equation, and the latent space comprises H data dimensions. In some embodiments, optimizing the first mapping and the second mapping comprises optimizing the first mapping and the second mapping through reinforcement learning. For example, the first and second mapping may be initialized with certain parameters (e.g., B, a, b) and optimized through the reinforcement learning to train the model. The goal of the reinforcement learning may be generating the Bezier surface that separates as many labeled risky and safe transactions as possible. That is, optimally, the Bezier surface would be able to separate all labeled risky transactions on one side, and all labeled safe transaction on the other side.

In some embodiments, one or more components of the computer system 102 may be configured to obtain a proposed transaction comprising the plurality of data dimensions; map the proposed transaction to a space of the plurality of data dimensions, wherein the Bezier surface is generated in the space of the plurality of data dimensions; in response to finding the proposed transaction falling on the one side of the Bezier surface, prevent or delay execution of the proposed transaction; and in response to finding the proposed transaction falling on the another side of the Bezier surface, permit execution of the proposed transaction.

Figure 2B:
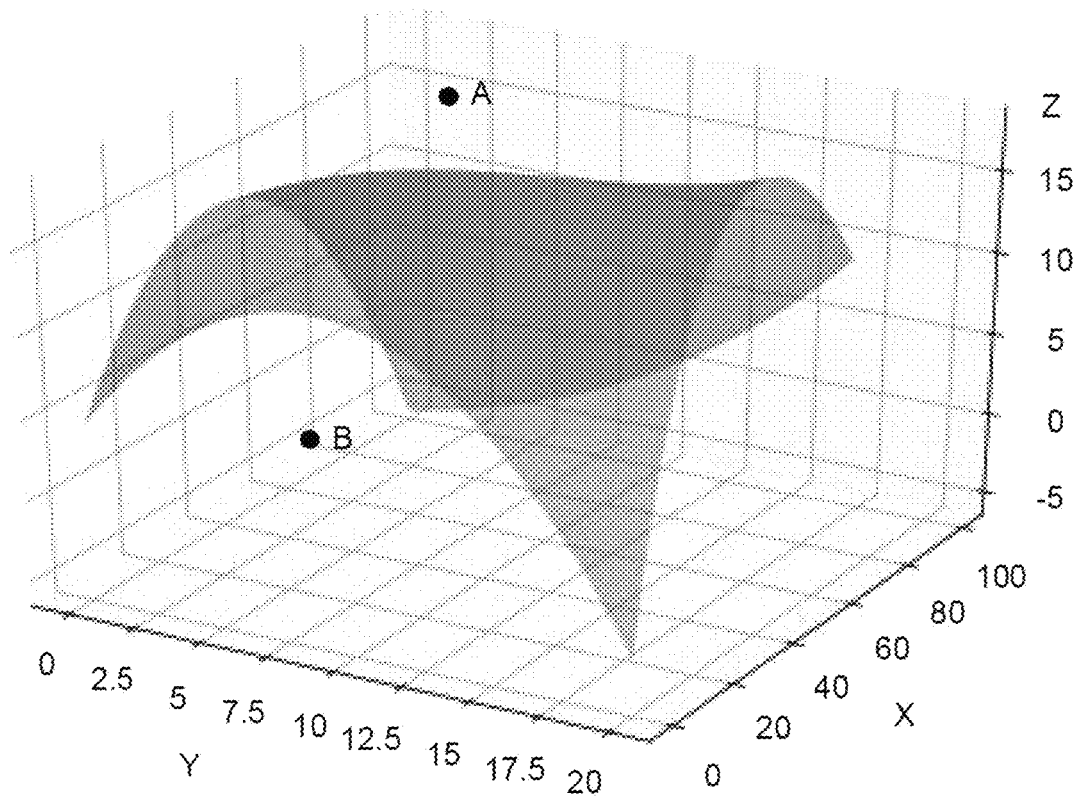
FIG. 2B illustrates an example of a 3D Bezier surface in accordance with some embodiments.

Referring to FIG. 2B, FIG. 2B illustrates an example of a 3D Bezier surface in accordance with some embodiments. In one example, for the 3D Bezier surface, the X and Y axes may represent the input space (e.g., transaction time and transaction amount), and the Z axis may represent the output space (e.g., risk level). The 3D Bezier surface may be generated as a boundary to divide risky and safe transactions. That is, through initializing and optimizing the first and second mappings, the 3D Bezier surface may be generated to divide the labeled transactions with at least a threshold percentage (e.g., 99%) of the labeled risky transactions above the surface and at least a threshold percentage (e.g., 95%) of the labeled safe transactions under the surface. Thus, the 3D Bezier surface achieves the minimal accuracy for screening transactions. For example, transactions with unknown risk levels may be mapped to the space of the 3D Bezier surface according to their features to determine their risk levels. As shown, transaction A mapped above the 3D Bezier surface may be determined as a risky transaction, and transaction B mapped below the 3D Bezier surface may be determined as a safe transaction.

Similarly, a plurality of Bezier surfaces may be simultaneously generated to determine more granular risk levels for transactions. In some embodiments, optimizing the first mapping and the second mapping to generate the Bezier surface may comprise: optimizing the first mapping and the second mapping to generate at least a first Bezier surface corresponding to a high risk level and a second Bezier surface corresponding to a low risk level. In response to finding the proposed transaction falling on the one side of the Bezier surface, preventing or delaying execution of the proposed transaction may comprise: in response to finding the proposed transaction above the first Bezier surface and the second Bezier surface (corresponding to a risky transaction zone), preventing execution of the proposed transaction (e.g., blocking the proposed transaction), and in response to finding the proposed transaction between the first Bezier surface and the second Bezier surface (corresponding to a risk-neutral transaction zone), performing a verification step as a condition for permitting execution of the proposed transaction (e.g., requiring one or more parties to the transaction to verify identity). If the verification passes, the transaction may be permitted. Otherwise, the transaction may be blocked. In response to finding the proposed transaction falling on the another side of the Bezier surface, permitting execution of the proposed transaction may comprise: in response to finding the proposed transaction below the first Bezier surface and the second Bezier surface (corresponding to a safe transaction zone), permitting execution of the proposed transaction.

FIG. 3 illustrates a flowchart of a method 300 for evaluating risk in accordance with some embodiments. The method 300 may be performed by a device, apparatus, or system for evaluating risk. The method 300 may be performed by one or more components of the environment or system illustrated by FIGS. 1-2B, such as the computing system 102. The operations of the method 300 presented below are intended to be illustrative. Depending on the implementation, the method 300 may include additional, fewer, or alternative steps performed in various orders or in parallel.

Block 310 includes obtaining a plurality of transactions each comprising a plurality of data dimensions, wherein some of the plurality of transactions are labeled as risky transactions and some of the plurality of transactions are labeled as safe transactions. In some embodiments, the plurality of data dimensions comprise one or more of the following: transaction time, transaction location, transaction frequency, user history, transaction amount, and risk level. In some embodiments, the plurality of data dimensions comprise at least three data dimensions; and the at least three data dimensions comprise a risk level of a transaction sender, a risk level of a transaction recipient, and a transaction amount.

Block 320 includes obtaining at least one of the plurality of data dimensions as an output space and the plurality of data dimensions other than the at least one data dimension as an input space. In some embodiments, the input space comprises a feature vector; the output space comprises an output vector; and the latent space comprises two or more parametric coordinates. In some embodiments, the output vector of each of the plurality of transactions is differentiable.

Block 330 includes initializing a first mapping from the input space to a latent space and a second mapping from the latent space to the output space, wherein the first mapping comprises mapping the input space to the latent space according to an inverse of a generalized linear model. In some embodiments, the second mapping comprises mapping the latent space to the output space through an H-data dimensional Bernstein polynomial. In some embodiments, the generalized linear model maps the latent space to the input space through a link function. In some embodiments, the link function comprises an identity function, a log function, or a logit function.

Block 340 includes optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary. In some embodiments, optimizing the first mapping and the second mapping comprises optimizing the first mapping and the second mapping through reinforcement learning. In some embodiments, optimizing the first mapping comprises solving a first order H-data dimensional equation; and the latent space comprises H data dimensions.

In some embodiments, the method further comprises: obtaining a proposed transaction comprising the plurality of data dimensions; mapping the proposed transaction to a space of the plurality of data dimensions, wherein the Bezier surface is generated in the space of the plurality of data dimensions; in response to finding the proposed transaction falling on the one side of the Bezier surface, preventing or delaying execution of the proposed transaction; and in response to finding the proposed transaction falling on the another side of the Bezier surface, permitting execution of the proposed transaction.

In some embodiments, optimizing the first mapping and the second mapping to generate the Bezier surface comprises optimizing the first mapping and the second mapping to generate at least a first Bezier surface corresponding to a high risk level and a second Bezier surface corresponding to a low risk level. In response to finding the proposed transaction falling on the one side of the Bezier surface, preventing or delaying execution of the proposed transaction comprises: in response to finding the proposed transaction above the first Bezier surface and the second Bezier surface, preventing execution of the proposed transaction, and in response to finding the proposed transaction between the first Bezier surface and the second Bezier surface, performing a verification step as a condition for permitting execution of the proposed transaction. In response to finding the proposed transaction falling on the another side of the Bezier surface, permitting execution of the proposed transaction comprises: in response to finding the proposed transaction below the first Bezier surface and the second Bezier surface, permitting execution of the proposed transaction.

Figure 4:
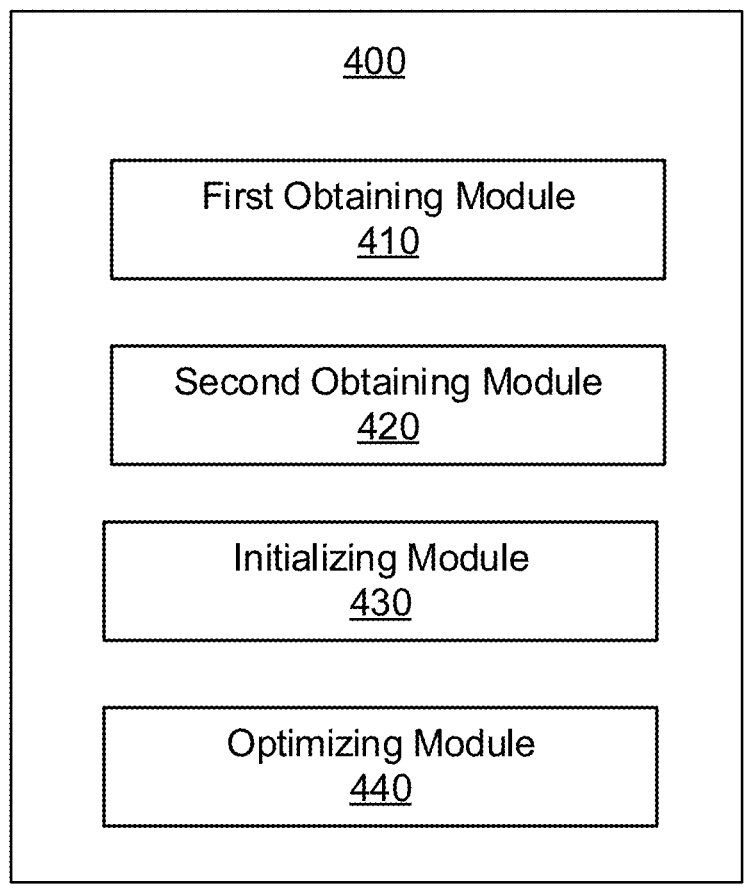
FIG. 4 illustrates a block diagram of a computer system for evaluating risk in accordance with some embodiments.

FIG. 4 illustrates a block diagram of a computer system 400 apparatus for evaluating risk in accordance with some embodiments. The components of the computer system 400 presented below are intended to be illustrative. Depending on the implementation, the computer system 400 may include additional, fewer, or alternative components.

The computer system 400 may be an example of an implementation of one or more components of the computing system 102. The method 300 may be implemented by the computer system 400. The computer system 400 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 300. The computer system 400 may comprise various units/modules corresponding to the instructions (e.g., software instructions).

In some embodiments, the computer system 400 may be referred to as an apparatus for evaluating risk. The apparatus may comprise a first obtaining module 410 for obtaining a plurality of transactions each comprising a plurality of data dimensions, wherein some of the plurality of transactions are labeled as risky transactions and some of the plurality of transactions are labeled as safe transactions; a second obtaining module 420 for obtaining at least one of the plurality of data dimensions as an output space and the plurality of data dimensions other than the at least one data dimension as an input space; an initializing module 430 for initializing a first mapping from the input space to a latent space and a second mapping from the latent space to the output space, wherein the first mapping comprises mapping the input space to the latent space according to an inverse of a generalized linear model; and an optimizing module 440 for optimizing the first mapping and the second mapping to generate a Bezier surface as a boundary that divides the plurality of transactions with a threshold percentage of the risky transactions falling on one side of the boundary and a threshold percentage of the safe transactions falling on another side of the boundary. The first obtaining module 410 may correspond to the first obtaining component 112. The second obtaining module 420 may correspond to the second obtaining component 114. The initializing module 430 may correspond to the inputting component 116. The optimizing module 440 may correspond to the optimizing component 118.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 5:
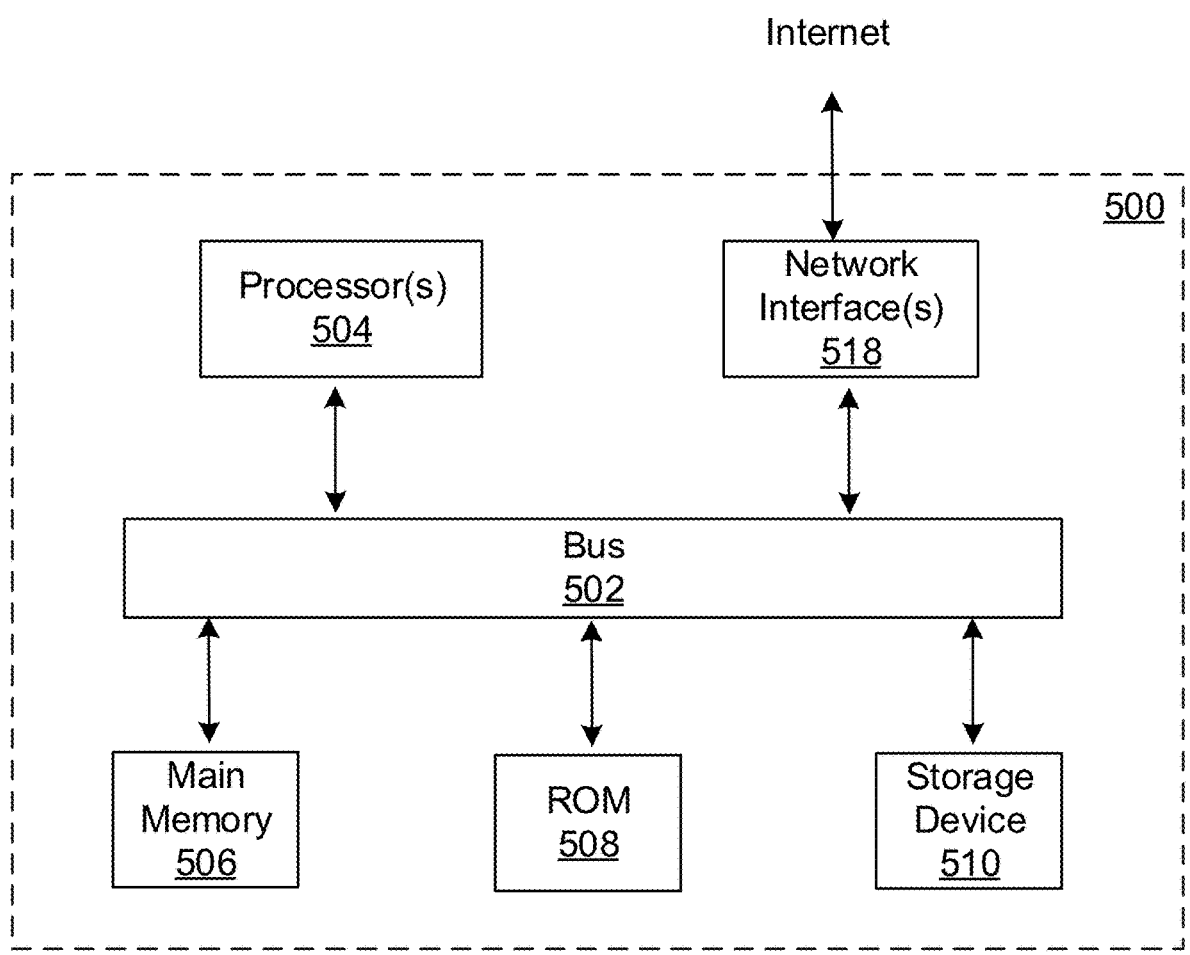
FIG. 5 illustrates a block diagram of a computer system in which any of the embodiments described herein may be implemented.

FIG. 5 illustrates a block diagram of a computer system 500 in which any of the embodiments described herein may be implemented. The computer system 500 may be implemented in any of the components of the devices, apparatuses, or systems illustrated in FIGS. 1-4, such as the computing system 102. One or more of the methods illustrated by FIGS. 1-4, such as the method 300, may be performed by one or more implementations of the computer system 500.

The computer system 500 may include a bus 502 or other communication mechanism for communicating information, one or more hardware processor(s) 504 coupled with bus 502 for processing information. Hardware processor(s) 504 may be, for example, one or more general purpose microprocessors.

The computer system 500 may also include a main memory 506, such as a random-access memory (RAM), cache and/or other dynamic storage devices, coupled to bus 502 for storing information and instructions executable by processor(s) 504. Main memory 506 also may be used for storing temporary variables or other intermediate information during execution of instructions executable by processor(s) 504. Such instructions, when stored in storage media accessible to processor(s) 504, render computer system 500 into a special-purpose machine that is customized to perform the operations specified in the instructions. The computer system 500 may further include a read only memory (ROM) 508 or other static storage device coupled to bus 502 for storing static information and instructions for processor(s) 504. A storage device 510, such as a magnetic disk, optical disk, or USB thumb drive (Flash drive), etc., may be provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 may cause processor(s) 504 to perform the process steps described herein. In alternative embodiments, hard-wired circuitry may be used in place of or in combination with software instructions.

The main memory 506, the ROM 508, and/or the storage device 510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 may include a network interface 518 coupled to bus 502. Network interface 518 may provide a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 may send and receive electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for evaluating risk, comprising:
   obtaining, by a computer system from a data storage, a plurality of transactions each comprising a plurality of data dimensions, wherein some of the plurality of transactions are labeled as risky transactions and some of the plurality of transactions are labeled as safe transactions;
   obtaining, by the computer system from the plurality of transactions, at least one of the plurality of data dimensions as an output space and the plurality of data dimensions other than the at least one data dimension as an input space;
   initializing, by the computer system, a first mapping from the input space to a latent space and a second mapping from the latent space to the output space, wherein the first mapping comprises mapping the input space to the latent space according to an inverse of a generalized linear model;
   training, by the computer system using the plurality of transactions as training data, the first mapping and the second mapping to generate a Bezier surface in a simulation space as a boundary that divides the plurality of transactions with a threshold percentage of the risky transactions falling on one side of the boundary and a threshold percentage of the safe transactions falling on another side of the boundary, wherein the simulation space comprises the input space and the output space;
   obtaining, by the computer system from one or more devices, a proposed transaction that comprises the plurality of data dimensions;
   mapping, by the computer system, the proposed transaction to the output space in the simulation space according to the trained first mapping and the trained second mapping by inputting the plurality of data dimensions of the proposed transaction to the input space; and
   in response to finding the proposed transaction falling on the one side of the Bezier surface associated with the risky transactions, preventing, by the computer system, or delaying, by the computer system, execution of the proposed transaction in the one or more devices; or
   in response to finding the proposed transaction falling on the another side of the Bezier surface associated with the safe transactions, permitting, by the computer system, execution of the proposed transaction in the one or more devices.

2. The method of claim 1, wherein:
   training the first mapping and the second mapping to generate the Bezier surface comprises: optimizing the first mapping and the second mapping to generate at least a first Bezier surface corresponding to a high risk level and a second Bezier surface corresponding to a low risk level;
   in response to finding the proposed transaction falling on the one side of the Bezier surface, preventing or delaying execution of the proposed transaction comprises:
      in response to finding the proposed transaction above the first Bezier surface and the second Bezier surface, preventing execution of the proposed transaction, and
      in response to finding the proposed transaction between the first Bezier surface and the second Bezier surface, performing a verification step as a condition for permitting execution of the proposed transaction; and
   in response to finding the proposed transaction falling on the another side of the Bezier surface, permitting execution of the proposed transaction comprises: in response to finding the proposed transaction below the first Bezier surface and the second Bezier surface, permitting execution of the proposed transaction.

3. The method of claim 1, wherein:
the input space comprises a feature vector;
the output space comprises an output vector; and
the latent space comprises two or more parametric coordinates.

4. The method of claim 3, wherein:
the output vector is differentiable.

5. The method of claim 1, wherein:
the plurality of data dimensions comprise one or more of the following: transaction time, transaction location, transaction frequency, user history, transaction amount, and risk level.

6. The method of claim 1, wherein:
the plurality of data dimensions comprise at least three data dimensions; and
the at least three data dimensions comprise a risk level of a transaction sender, a risk level of a transaction recipient, and a transaction amount.

7. The method of claim 1, wherein:
training the first mapping comprises solving a first order H-data dimensional equation; and
the latent space comprises H data dimensions.

8. The method of claim 1, wherein:
training the first mapping and the second mapping comprises optimizing the first mapping and the second mapping through reinforcement learning.

9. The method of claim 1, wherein:
the generalized linear model maps the latent space to the input space through a link function.

10. The method of claim 9, wherein:
the link function comprises an identity function, a log function, or a logit function.

11. The method of claim 1, wherein:
the second mapping comprises mapping the latent space to the output space through an H-data dimensional Bernstein polynomial.

12. A system for evaluating risk, comprising one or more processors and one or more computer-readable memories, the memories coupled to the one or more processors and having instructions stored thereon that are executable by the one or more processors to perform operations comprising:
obtaining, by the system from data storage, a plurality of transactions each comprising a plurality of data dimensions, wherein some of the plurality of transactions are labeled as risky transactions and some of the plurality of transactions are labeled as safe transactions;
obtaining, by the system from the plurality of transactions, at least one of the plurality of data dimensions as an output space and the plurality of data dimensions other than the at least one data dimension as an input space;
initializing, by the system, a first mapping from the input space to a latent space and a second mapping from the latent space to the output space, wherein the first mapping comprises mapping the input space to the latent space according to an inverse of a generalized linear model; and
training, by the system using the plurality of transactions as training data, the first mapping and the second mapping to generate a Bezier surface in a simulation space as a boundary that divides the plurality of transactions with a threshold percentage of the risky transactions falling on one side of the boundary and a threshold percentage of the safe transactions falling on another side of the boundary, wherein the simulation space comprises the input space and the output space;
obtaining, by the system from one or more devices, a proposed transaction that comprises the plurality of data dimensions;
mapping, by the system, the proposed transaction to the output space in the simulation space according to the trained first mapping and the trained second mapping by inputting the plurality of data dimensions of the proposed transaction to the input space; and
in response to finding the proposed transaction falling on the one side of the Bezier surface associated with the risky transactions, preventing, by the system, or delaying, by the system, execution of the proposed transaction in the one or more devices, or
in response to finding the proposed transaction falling on the another side of the Bezier surface associated with the safe transactions, permitting, by the system, execution of the proposed transaction in the one or more devices.

13. The system of claim 12, wherein training the first mapping and the second mapping to generate the Bezier surface comprises:
optimizing the first mapping and the second mapping to generate at least a first Bezier surface corresponding to a high risk level and a second Bezier surface corresponding to a low risk level;
in response to finding the proposed transaction falling on the one side of the Bezier surface, preventing or delaying execution of the proposed transaction comprises:
in response to finding the proposed transaction above the first Bezier surface and the second Bezier surface, preventing execution of the proposed transaction, and
in response to finding the proposed transaction between the first Bezier surface and the second Bezier surface, performing a verification step as a condition for permitting execution of the proposed transaction; and
in response to finding the proposed transaction falling on the another side of the Bezier surface, permitting execution of the proposed transaction comprises: in response to finding the proposed transaction below the first Bezier surface and the second Bezier surface, permitting execution of the proposed transaction.

14. The system of claim 12, wherein the input space comprises a feature vector, the output space comprises an output vector, and the latent space comprises two or more parametric coordinates.

15. A non-transitory computer-readable storage medium configured with instructions executable by one or more processors to cause the one or more processors to perform operations comprising:
obtaining, by a computer system from one or more devices, a plurality of transactions each comprising a plurality of data dimensions, wherein some of the plurality of transactions are labeled as risky transactions and some of the plurality of transactions are labeled as safe transactions;
obtaining, by the computer system from the plurality of transactions, at least one of the plurality of data dimensions as an output space and the plurality of data dimensions other than the at least one data dimension as an input space;
initializing, by the computer system, a first mapping from the input space to a latent space and a second mapping from the latent space to the output space, wherein the first mapping comprises mapping the input space to the latent space according to an inverse of a generalized linear model; and training, by the computer system using the plurality of transactions as training data, the first mapping and the second mapping to generate a Bezier surface in a simulation space as a boundary that divides the plurality of transactions with a threshold percentage of the risky transactions falling on one side of the boundary and a threshold percentage of the safe transactions falling on another side of the boundary, wherein the simulation space comprises the input space and the output space;

obtaining, by the computer system from one or more devices, a proposed transaction that comprises the plurality of data dimensions;

mapping, by the computer system, the proposed transaction to the output space in the simulation space according to the trained first mapping and the trained second mapping by inputting the plurality of data dimensions of the proposed transaction to the input space; and in response to finding the proposed transaction falling on the one side of the Bezier surface associated with the risky transactions, preventing, by the computer system, or delaying, by the computer system, execution of the proposed transaction in the one or more devices; or in response to finding the proposed transaction falling on the another side of the Bezier surface associated with the safe transactions, permitting, by the computer system, execution of the proposed transaction in the one or more devices.

16. The storage medium of claim 15, wherein training the first mapping and the second mapping to generate the Bezier surface comprises:

optimizing the first mapping and the second mapping to generate at least a first Bezier surface corresponding to a high risk level and a second Bezier surface corresponding to a low risk level;

in response to finding the proposed transaction falling on the one side of the Bezier surface, preventing or delaying execution of the proposed transaction comprises:
  in response to finding the proposed transaction above the first Bezier surface and the second Bezier surface, preventing execution of the proposed transaction, and
  in response to finding the proposed transaction between the first Bezier surface and the second Bezier surface, performing a verification step as a condition for permitting execution of the proposed transaction; and in response to finding the proposed transaction falling on the another side of the Bezier surface, permitting execution of the proposed transaction comprises: in response to finding the proposed transaction below the first Bezier surface and the second Bezier surface, permitting execution of the proposed transaction.

17. The storage medium of claim 15, wherein the input space comprises a feature vector, the output space comprises an output vector, and the latent space comprises two or more parametric coordinates.

\* \* \* \* \*